United States Patent
Jungnickel et al.

(10) Patent No.: US 10,802,454 B2
(45) Date of Patent: Oct. 13, 2020

(54) DEVICE FOR COORDINATED CONTROLLING OF AN OPERATING STATE OF A PRODUCTION PLANT AND PRODUCTION SYSTEM AND METHOD

(71) Applicant: Siemens Aktiengesellschaft, Munich (DE)

(72) Inventors: Frank Jungnickel, Bräuningshof / Langensendelbach (DE); Amjad Mohsen, Erlangen (DE); Jörn Peschke, Nuremberg (DE)

(73) Assignee: SIEMENS AKTIENGESELLSCHAFT (DE)

( * ) Notice: Subject to any disclaimer, the term of this patent is extended or adjusted under 35 U.S.C. 154(b) by 175 days.

(21) Appl. No.: 15/535,531

(22) PCT Filed: Nov. 24, 2015

(86) PCT No.: PCT/EP2015/077485
§ 371 (c)(1),
(2) Date: Jun. 13, 2017

(87) PCT Pub. No.: WO2016/096334
PCT Pub. Date: Jun. 23, 2016

(65) Prior Publication Data
US 2017/0343976 A1   Nov. 30, 2017

(30) Foreign Application Priority Data

Dec. 16, 2014   (DE) .................. 10 2014 226 075

(51) Int. Cl.
*G05B 19/042*     (2006.01)
*G06Q 50/04*      (2012.01)
(Continued)

(52) U.S. Cl.
CPC ......... *G05B 19/0426* (2013.01); *G05B 15/02* (2013.01); *G05B 19/056* (2013.01);
(Continued)

(58) Field of Classification Search
None
See application file for complete search history.

(56) References Cited

U.S. PATENT DOCUMENTS 4,153,936 A * 5/1979 Schmitz ............... H02J 3/14
  307/41
5,389,952 A * 2/1995 Kikinis .............. G03G 15/5075
  345/212

(Continued)

FOREIGN PATENT DOCUMENTS

CN    1536457 A    10/2004
DE    10037996 A1  2/2002
(Continued)

OTHER PUBLICATIONS

Non-English Chinese Office action for application No. 201580068841.9, dated Oct. 29, 2018.
(Continued)

*Primary Examiner* — Mohammad Ali
*Assistant Examiner* — David Earl Ogg
(74) *Attorney, Agent, or Firm* — Schmeiser, Olsen & Watts LLP

(57) ABSTRACT

A device for controlling an operating state of at least one component of a production plant, including an energy control unit for providing a state change signal for changing the operating state of the at least one component from a first operating state to a second operating state, wherein the device includes a monitoring unit which is designed to receive the state change signal of the energy control unit, and to provide the state change signal of the energy control unit
(Continued)

for changing the first operating state to the second operating state, and to modify the state change signal of the energy control unit for providing the second operating state, and to block the state change signal of the energy control unit for preventing a change of state into the second operating state.

14 Claims, 1 Drawing Sheet

(51) Int. Cl.
    *G05B 19/05*     (2006.01)
    *G06Q 10/06*     (2012.01)
    *G06F 1/3209*     (2019.01)
    *G06F 1/3203*     (2019.01)
    *H02J 50/80*     (2016.01)
    *G05B 15/02*     (2006.01)
    *G05B 19/418*     (2006.01)
    *H02J 3/14*     (2006.01)
    *H04L 12/28*     (2006.01)

(52) U.S. Cl.
    CPC ..... *G05B 19/41865* (2013.01); *G06F 1/3203* (2013.01); *G06F 1/3209* (2013.01); *G06Q 10/06* (2013.01); *G06Q 50/04* (2013.01); *H02J 3/14* (2013.01); *H02J 50/80* (2016.02); *H04L 12/2816* (2013.01); *G05B 19/0428* (2013.01); *G05B 2219/15098* (2013.01); *G05B 2219/23316* (2013.01); *G05B 2219/2639* (2013.01); *G05B 2219/34306* (2013.01); *Y02P 70/163* (2015.11); *Y02P 80/114* (2015.11)

(56) References Cited

U.S. PATENT DOCUMENTS

| 7,143,016 | B1* | 11/2006 | Discenzo ........... G05B 13/0265 |
| --- | --- | --- | --- |
| | | | 703/3 |
| 2004/0255013 | A1 | 12/2004 | Ott et al. |
| 2009/0037040 | A1* | 2/2009 | Salmon ................... B63B 17/00 |
| | | | 701/21 |
| 2010/0161121 | A1* | 6/2010 | Finsterwalder .. G05B 19/41835 |
| | | | 700/245 |
| 2010/0168897 | A1 | 7/2010 | August et al. |
| 2012/0166642 | A1* | 6/2012 | Saint Clair ........... H04L 67/125 |
| | | | 709/225 |
| 2014/0001846 | A1 | 1/2014 | Mosebrook et al. |
| 2015/0032230 | A1 | 1/2015 | Dallmann et al. |
| 2015/0355658 | A1* | 12/2015 | Simon ....................... H02J 3/14 |
| | | | 700/276 |
| 2016/0261145 | A1* | 9/2016 | Kinoshita ............... H02J 17/00 |

FOREIGN PATENT DOCUMENTS

| EP | 2192458 A1 | 6/2010 |
| --- | --- | --- |
| EP | 2244142 A1 | 10/2010 |
| EP | 2455827 A1 | 5/2012 |
| WO | WO 2010034333 A1 | 4/2010 |
| WO | WO 2013044964 A1 | 4/2013 |
| WO | WO 2013131556 A1 | 9/2013 |

OTHER PUBLICATIONS

International Search Report for PCT Application No. PCT/EP2015/077485, dated Mar. 8, 2016.

* cited by examiner

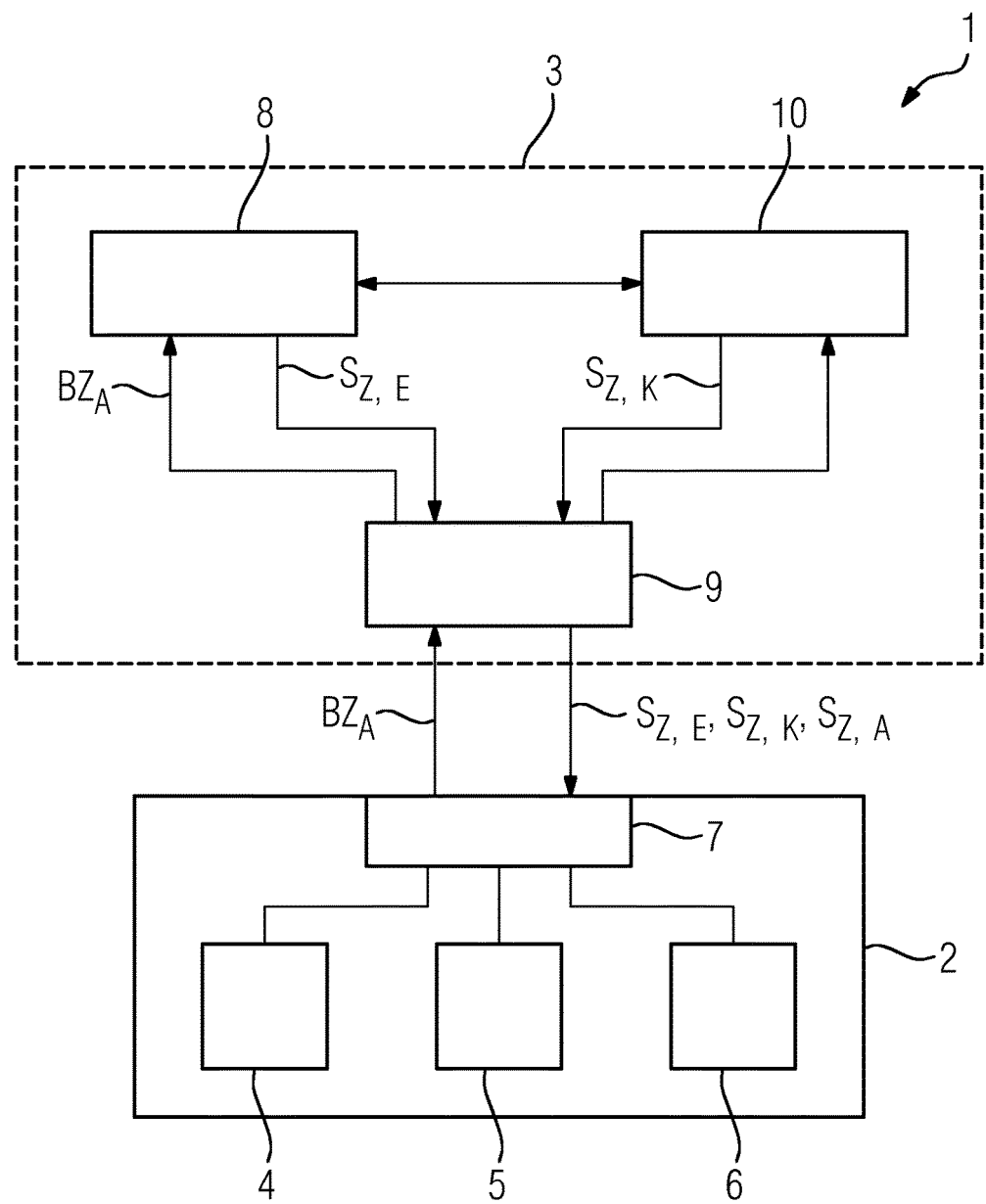

DEVICE FOR COORDINATED CONTROLLING OF AN OPERATING STATE OF A PRODUCTION PLANT AND PRODUCTION SYSTEM AND METHOD

CROSS-REFERENCE TO RELATED APPLICATIONS

This application claims priority to PCT Application No. PCT/EP2015/077485, having a filing date of Nov. 24, 2015, based off of German application No. DE 102014226075.2 having a filing date of Dec. 16, 2014, both of which are hereby incorporated by reference.

FIELD OF TECHNOLOGY

The following relates to a device for the coordinated controlling of an operating state of at least one component of a production plant, having an energy control device for providing a state change signal for changing the operating state of the at least one component from a first operating state into a second operating state. Embodiments of the invention also relate to a production system and to a method.

BACKGROUND

Production systems or industrial plants, respectively, are known and are usually applied for the automatic manufacture of products and for the automated performance of processes. Such automated production systems or industrial plants, respectively, comprise normally a number of components, for example machines. These components can be shut down or idle for considerable periods of time during the production. Such idling periods arise, on the one hand, due to planned events and, on the other hand, due to unforeseeable events. Planned events are, for example, maintenance of one or more components of the industrial plant, pauses or holiday times. Unforeseeable events are normally disturbances or defects in the industrial plants. Idling periods can also be caused by temporarily different loads on one or more components of the production system. During these idling periods, the components consume usually a considerable amount of energy, however.

In order to reduce the amount of energy during the idling periods and by this increase the energy efficiency of the complete industrial plant, energy control facilities are known. An energy control device, a so-called energy switch controller (ESC) is shown in WO 2013/044964 A1 and is used for energy efficiency management of the industrial plant. In this context, the ESC places the components of the industrial plant into certain operating states in which the components consume as little energy as possible, based on an industrial plant-specific structural model by coordinated and reliable state changes. Such an operating state can be, for example, an on state, an off state or a standby state.

In addition, the ESC can comprise a communication interface for communication with a higher-level control system. Such a higher-level control system can be, for example, a management execution system (MES), a production control system, a supervisory control and data acquisition system (SCADA) or a load management system. However, the higher-level control system and the ESC are not necessarily developed to be interacting. Thus, a complete synchronization between the two systems cannot be guaranteed every time, especially during the periods of different loads. It is the aim of the higher-level control system to generate a sequence of commands for the components in order to secure a coordinated, reliable and peak-performance-oriented production flow. In contrast, it is the aim of the energy switch controller to provide as energy efficient as possible an operating state of the components within a period in which utilization of the components is not expected. If the ESC then interrupts the sequence of commands of the higher-level control system, these contradictory state change signals of the higher-level control system and of the energy switch control lead to uncontrollable conflicts within the automated production system. Thus, it can be, for example, that the ESC provides during an unpredictable pause caused by disturbances a command or a state change signal by which the components affected are brought into the standby state or the off state. If the disturbance is caused by a defective component or a missing workpiece, the duration of the pause is normally unknown. As soon as the disturbance has been eliminated, a reactivation of the industrial plant or of the components affected is initiated by the higher-level control system. These state change signals of the higher-level control system are not known to the energy switch controller, as a rule. The ESC thereupon may request further state changes which can be contradictory to the new operating states which are being provided by the higher-level control system.

As well, the higher-level control system, or an operator of the industrial plant, can send commands to the components during planned pauses of the industrial plant in order to start a production process, for example. This changes the current operating state of the corresponding components in the plant without the ESC being informed about them. In addition, the components of the industrial plant and/or the higher-level control device can have energy saving functions by which the components can be placed into a standby mode, for example. These state changes caused by the energy saving functions are also usually not communicated to the ESC.

All these situations described can lead to command conflicts by which the ESC can be placed into an undefined state. The consequences of such a conflict can be, for example, economic losses and the functional in capacity of the energy switch controller so that the latter cannot perform any energy saving measures. In addition, the conflicts can trigger an interruption of the operation of the complete industrial plant or of the complete production system if the state change signal or the command of the energy switch controller overwrites the slowed-down operating state of the higher-level control system.

SUMMARY

An aspect relates to providing a solution by which a reliable, conflict-free and controlled production sequence of a production plant can be achieved.

A device according to embodiments of the invention are used for controlling an operating state of at least one component of a production plant. The device comprises an energy control device for providing a state change signal for changing the operating state of the at least one component from a first operating state into a second operating state. In addition, the device has a monitoring device which is designed to receive the state change signal of the energy control device and to provide the state change signal of the energy control device for changing the first operating state into the second operating state, and to modify the state change signal of the energy control device for providing the second operating state and to block the state change signal of the energy control device for preventing a state change into the second operating state.

The energy control device can be designed as the energy switch controller already described, which, for example, can produce state changes or state transitions of the at least one component on the basis of a structural model of the production plant by providing a state change signal. The operating states of the at least one component can be, for example, an off state, an on state, a standby state, a full-load operating state or a part-load operating state. In particular, an energy consumption of the at least one component differs within the various operating states.

According to the embodiments of the invention, it is then provided that the monitoring device is provided and coupled to the energy control device so that the monitoring device can receive the state change signal of the energy control device. In particular, the at least one component is no longer provided directly with the state change signal of the energy control device by the energy control device. The state change signal is transmitted first to the monitoring device which checks the state change signal of the energy control device. The monitoring device which is also designated as unified energy management interface (EMUnI) forwards the state change signal of the energy control device either unchanged to the at least one component so that the change from the first to the second operating state intended by the energy control device is completed or modifies the state change signal in such a manner that the change from the first into the second operating state intended by the energy control device can be completed, or blocks the state change signal of the energy control device so that the first operating state of the at least one component is not changed and the at least one component remains in the first operating state.

By the monitoring device, a controlled, reliable and conflict-free operation of the production plant can thus be advantageously guaranteed.

According to one embodiment of the invention, the monitoring device is designed to provide a third operating state alternative to the second operating state if the monitoring device blocks the state change signal of the energy control device. The monitoring device is thus designed to replace the state change signal of the energy control device by another alternative state change signal by which the at least one component is placed into the third operating state. Thus, the monitoring device can provide another operating state, for example in the case of a conflict of commands. The device is thus designed to be particularly flexible.

Particularly preferably, the monitoring device is designed to provide the energy control device, for synchronizing the energy control device with the at least one component, with a current operating state of the at least one component. Especially if the monitoring device has blocked the signal of the control device and/or if the monitoring device has provided the alternative third operating state for the at least one component and/or if the at least one component has its own energy saving function by which the operating state of the at least one component has been changed, the current operating state of the at least one component is conveyed to the energy control device by the monitoring device. According to the prior art, this return message has not taken place so that the energy control device, when providing the new state change signals, has used a wrong current operating state as a basis and as a result has been placed into an undefined state.

For the purpose of communication with the energy control device, the monitoring device can have, for example, a bidirectional communication interface. Via this communication interface, the monitoring device can inform the energy control device of the current operating state of the component. In this context, the monitoring device can read out, for example, the current operating state of the at least one component in order to inform the energy control device that the operating state of the at least one component has been changed by the component-related energy saving function. It can also be provided that the monitoring device provides the energy control device with a signal by which the monitoring device informs the energy control device that the monitoring device has blocked the state change signal of the energy control device and the at least one component is thus in the first operating state as before, and/or that the monitoring device has modified the state change signal of the energy control device and the at least one component is now in the third operating state.

It is thus advantageously possible to ensure that the energy control device remains permanently synchronized with the at least one component. It is thus possible to prevent that the energy control device, when providing other state change signals uses a wrong current operating state as a basis and is placed into the undefined state. By this, a defined state can be provided at any time for the energy control device as well as a conflict-free operation of the production plant.

It can be provided that the monitoring device is designed to block the state change signal of the energy control device if changing the first operating state into the second operating state is specified as an unallowed and/or as an impossible state change. An unallowed and/or impossible state change places the at least one component into an unallowed and/or impossible operating state. An unallowed and/or impossible operating state is an operating state which is not provided for the at least one component and/or which is not achievable for the at least one component. These impossible and/or unallowed state changes can be stored, for example, in a list, based on which the monitoring device can block the state change signal of the energy control device.

One embodiment of the invention provides that the device has a higher-level control device which is designed to provide a further state change signal, and the monitoring device is designed to communicate with the higher-level control device. For this purpose, the monitoring device can have a communication interface for communication with the higher-level control device. Via this communication interface, the monitoring device can receive the further state change signal of the higher-level control device. The monitoring device is thus designed to receive the state change signals of the energy control device and of the higher-level control device. Thus, a state change of the at least one component can be coordinated by the monitoring device.

It can be provided that the monitoring device is designed to provide the state change signal of the energy control device and to block the further state change signal of the higher-level control device if the state change signal of the energy control device has a predetermined, higher priority than the further state change signal of the higher-level control device and to provide the further state change signal of the higher-level control device and to block the state change signal of the energy control device if the further state change signal of the higher-level control device has the predetermined higher priority. In this context, a priority can be predetermined for each state change signal of the energy control device. The state change signal of the energy control system can thus be assigned a higher/lower priority than the state change signal of the higher-level control device in the case of a conflict with the further state change signal of the higher-level control device and thereupon the state change signal of the energy control device can be forwarded/ blocked. This priority can be specified once, for example, in the case of a start-up of the production plant or be changed dynamically by the operator of the production plant.

The monitoring device or EMUnI thus checks and coordinates all state changes in order to guarantee a freedom from conflict of the commands of the energy control device with the commands of the higher-level control system.

In a further development of the embodiments of the invention, the monitoring device is designed to deactivate the energy control device for blocking the state change signal and/or activate it for providing the state change signal. For this purpose, the energy control device or the ESC, respectively, can be deactivated temporarily, i.e. over a certain period, for example in the case of conflicts between the energy control device and the higher-level control device and/or on demand by the higher-level control device in the case of a disturbance. During this period, the energy control device can be operated in a state of rest or in a synchronizable state, a so-called "keep-synchronized" state. During the "keep-synchronized" state, the monitoring device can ignore all state change signals provided by the energy control device and provide to the energy control unit, for example after a state change or an alteration of state, the current operating state of the at least one component. In addition, the monitoring device can be designed to communicate to the energy control device in the case of a known period of time of the "keep-synchronized" state, the period of time of the "keep-synchronized" state or, in the case of an unknown period of time of the "keep-synchronized" state, an unrestricted wait signal. Thus, the energy control device can be advantageously isolated from the production plant without a loss of synchronization.

As soon as the conflict or the disturbance, respectively, is eliminated and the production plant is operable again, the monitoring device can reactivate the energy control device, that is to say initiate an ESC reset.

According to an advantageous embodiment of the invention, the energy control device is designed to read out the current operating state of the at least one component after the activation. Thus, if, for example, the energy control device has been deactivated by the monitoring device and subsequently reactivated again, the energy control device can be synchronized again by the reading-out, that is to say informed about the current state of the at least one component.

It has been found to be advantageous if the monitoring device is designed to monitor a state change time of the state change from the first operating state into the second operating state and, if the state change time exceeds a predetermined threshold value, to specify the associated state change signal as an impossible and/or unallowed state change signal. The predetermined threshold value can be, for example, a component-specific switching delay and/or a component-specific reaction time which, in particular, is dependent on the respective component of the production plant and on the two operating states between which the respective component is to change. Component-specific threshold values for each component can be deposited, for example, in a list. A state change time detected by the monitoring device, which exceeds the associated threshold value, can indicate, for example, a defect or a disturbance in the production plant or in the respective component. The monitoring device can then specify this state change signal by which the threshold value is exceeded in the state change, as an impossible and/or unallowed state change signal so that it is blocked by the monitoring device when it is provided again by the energy control device and/or be replaced by an alternative state change signal. The device is thus configured to be reliable and flexible. In addition, there can be an early determination of malfunctions of the various components of the production plant by the monitoring device.

The monitoring device is preferably designed to provide at least one intermediate operating state for modifying the state change signal of the energy control device if the second operating state can only be reached via the at least one intermediate operating state from the first operating state. For this purpose, for example possible and/or allowed state changes can be deposited in a list. With a state change signal provided by the energy control device, by which the first operating state of the at least one component is changed into the second operating state, the monitoring device can check by the list whether the second operating state can be reached directly or via the at least one intermediate operating state. If the second operating state can only be reached via the at last one intermediate operating state, the monitoring device can modify the state change signal of the energy control device in such a manner that the at least one component changes the first operating state first into the at least one intermediate operating state and then into the second operating state. Thus, an operating state provided by the energy control device can be provided for the at least one component in an advantageous manner.

In an embodiment of the invention, the monitoring device is designed to modify the state change signal for performing a test cycle. Such a test cycle can be used, for example, for energy consumption optimization. The monitoring device can check by the test cycle whether, for example, the change from the first operating state via an intermediate operating state into the second operating state is better with respect to energy than the direct change from the first into the second operating state. According to the prior art, the energy control device had to be extensively reprogrammed for checking the energy efficiency. According to an embodiment of the invention, the energy efficiency check can be provided in a simple manner by the monitoring device. The energy control device can thus be advantageously subjected to the extensive reprogramming process only when it has been confirmed by the monitoring device after performing the test cycle that the state change via the intermediate operating state is really better with respect to energy.

The embodiments of the invention also comprise a production system with a production plant, having a component and with the device according to an advantageous embodiment thereof.

Embodiments of the also comprise a method for controlling an operating state of at least one component of a production plant in which a state change signal is provided by an energy control device for changing the operating state of the at least one component from a first operating state into a second operating state. In addition, the state change signal of the energy control device is received by a monitoring device, and by the monitoring device either the state change signal of the energy control device is provided for changing the first operating state into the second operating state or the state change signal of the energy control device is modified for providing the second operating state or the state change signal of the energy control device is blocked for preventing the second operating state.

The preferred embodiments presented with respect to the device according to the invention, and their advantages apply correspondingly to the production system according to the invention and to the method according to the invention.

In the text which follows, the invention will now be explained in greater detail by a preferred exemplary embodiment and also with reference to the attached drawing.

The single FIGURE shows a diagrammatic representation of an embodiment of a production system according to the invention.

BRIEF DESCRIPTION

The FIGURE shows a production system comprising a production plant and a device for controlling operating states of the production plant.

DETAILED DESCRIPTION

The exemplary embodiment explained in the text which follows is a preferred embodiment of the invention. In the exemplary embodiment, however, the components of the embodiment described in each case represent individual features, to be considered independently of one another, of the invention which in each case also develop the invention independently of one another and thus should also be considered individually or in another combination as the one shown. Furthermore, the embodiment described can also be supplemented by other ones of the features of the invention already described.

The FIGURE shows a production system 1 comprising a production plant 2 and a device 3 for controlling operating states of the production plant 2. The production plant 2 here comprises three components 4, 5, 6 which, for example, can be designed as machines or production cells. In addition, the production plant 2 has here an interface 7, for example a control device, via which the components 4, 5, 6 can communicate with a device 3.

The device 3 here comprises an energy control device 8, a monitoring device 9 and a higher-level control device 10. In this context, the energy control device 8 can communicate bidirectionally with the monitoring device 9 and the higher-level control device 10 can communicate bidirectionally with the monitoring device. In this context, the energy control device 8, the monitoring device 9 and the higher-level control device 10 can have corresponding communication interfaces, not shown here.

The energy control device 8 is designed to provide respective state change signals $S_{Z,E}$ based on a structural model of the production plant 2, wherein an operating state corresponding to the respective component 4, 5, 6 can be changed from a first operating state into a second operating state by the respective state change signal $S_{Z,E}$. Such an operating state can be, for example, an on state, an off state, a standby state, a part-load operating state or a full-load operating state, the components 4, 5, 6 exhibiting a different energy consumption in the different operating states.

In addition, the higher-level control device 10 which, for example, can comprise a management execution system (MES) and/or a production control system and/or a supervisory control and data acquisition system (SCADA) and/or a load management system, designed to provide other state change signals $S_{Z,K}$ for changing the operating state of the respective components 4, 5, 6 and send them to the monitoring device 9.

The monitoring device 9 is designed to receive the respective state change signal $S_{Z,E}$ of the energy control device 8 and the further state change signal $S_{Z,K}$ of the higher-level control device. The monitoring device 9 can forward to the respective state change signal $S_{Z,E}$ of the energy control device to the corresponding component 4, 5, 6 so that it changes the first operating state into the second operating state.

In addition, the monitoring device 9 can modify the state change signal $S_{Z,E}$, so that the corresponding component 4, 5, 6 changes its operating state, for example via an intermediate operating state, into the second operating state. This modified state change signal can comprise, for example, a sequence of a number of state change signals. As well, the monitoring device can block the state change signal $S_{Z,E}$, so that the corresponding component 4, 5, 6 does not change its operating state into the second operating state. Instead of the blocked state change signal $S_{Z,E}$, the monitoring device 9 can provide for the respective component 4, 5, 6, for example an alternative state change signal $S_{Z,A}$ so that it alters its operating state into an alternative third operating state, or provide the further state change signal $S_{Z,K}$ of the higher-level monitoring device 10. The monitoring device 9 thus monitors and checks the commands or state changes, respectively, which are demanded by the energy control device 8 and either converts these, changes them or ignores them.

The monitoring device 9 can inform the energy control device 8, in particular, of the current operating states $BZ_A$ of the components 4, 5, 6 via the bidirectional communication interface. For this purpose, the monitoring device 9 can read out, for example, the current operating states $BZ_A$ of the components 4, 5, 6 via the interface 7 and forward these to the energy control device 8.

Reading out the current operating states $BZ_A$ is particularly advantageous since it can be provided that the components 4, 5, 6 and/or the higher-level control device 10 have their own energy saving functions by which an operating state of the components 4, 5, 6 can be changed. Such a state change provided by the energy saving functions can be communicated to the energy control device 8 via the monitoring device 9.

The monitoring device 9 can also provide the energy control device 8 with a signal by which the energy control device 8 is informed about a blocking and/or modifying and/or replacing of the state change signal $S_{Z,E}$ by the monitoring device 9.

Thus, the energy control device 8 is thus provided at any time with the current operating state $BZ_A$ of the respective component 4, 5, 6. The energy control device 8 is thus synchronized with the components 4, 5, 6 at any time.

The monitoring device 9 can be designed as a separate module having its own logic circuit for coordinating the state changes and the necessary communication interfaces for communicating with the energy control device 8 and/or the higher-level control device 10. But it can also be that the monitoring device 9 is designed as part of the energy control device 8 or of the higher-level control device 10.

The following examples are intended to illustrate the operation of the device 3:

For example, it can be that the energy control device 8 sends out the state change signal $S_{Z,E}$ in order to displace the component 4 from the standby state as the first operating state into an off state as the second operating state. This can be provided, for example, by the energy control device 8 for saving energy after the energy control device 8 has detected that the component 4 is in the stand-by state for a predetermined period of time. At the same time, however, the higher-level control device 10 sends out the state change signal $S_{ZK}$ by virtue of which the component 4 is to be displaced from the standby state into an on state, since the component 4, for example, is to take over a production step.

The monitoring device 9 receives both state change signals $S_{Z,E}$, $S_{Z,K}$ and decides by a predetermined list of priorities which one of the state change signals $S_{Z,E}$, $S_{Z,K}$ is to be forwarded. If, for example, it is provided that the state change signal $S_{Z,K}$ of the higher-level control device 10 has a higher priority, the state change signal $S_{Z,K}$ of the higher-level control device 10 is forwarded and the state change signal $S_{Z,K}$ of the energy control device 8 is blocked. The operating state of the component 4 is thus changed into the on state.

The monitoring device 9 informs the energy control device 8 that the state change signal $S_{Z,E}$ of the energy control device 8 has been blocked and that the current operating state $BZ_A$ of component 4 is now the on state.

It can also be provided, for example, that the energy control device 8 provides a state change signal $S_{Z,E}$ in which the operating state of the component 4 is to be changed from an on state into an off state. The monitoring device 9 determines, for example, by a predetermined list, however, that the off state of the component 4 cannot be reached directly from the on state. Instead, the component 4 must first be placed into an intermediate operating state, for example the standby state and from this intermediate operating state into the off state. The monitoring device 9 is thus designed to modify the state change signal $S_{Z,E}$ of the energy control device 8 such that the component 4, for example, is placed by a first state change signal from the on state into the standby state and by a second state change signal from the standby state into the off state.

It can also be provided that the energy control device 8 provides a state change signal $S_{Z,E}$ in the case of which the operating state of component 4 is to be changed from an on state into an off state. The monitoring device 9 finds that this state change is possible directly, that is to say without an intermediate operating state. To check, however, whether it is better from the point of view of energy to place the component 4 firstly into the intermediate operating state, for example the standby state, the monitoring device 9 can provide a test cycle in which the component 4 is first placed into the intermediate operating state. When the monitoring device 9 has verified that this state change via the intermediate operating state is better from the point of view of energy, the energy control device 8 can be, for example, reprogrammed so that it will itself provide the corresponding state change signal $S_{Z,E}$ in future.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A device for controlling an operating state of a plurality of components of a production plant, comprising:
   an energy control device for controlling operating states of the plurality of components of the production plant, wherein the energy control device determines an energy efficient operating state for each respective component of the plurality of components when use of the respective component of the plurality of components is not expected, and wherein the energy control device provides a first state change signal for changing the operating state of a first component of the plurality of components from a first operating state into a second operating state, wherein at least one of the first operating state and the second operating state are at least one of: an off state, an on state, and a stand-by state;
   a higher-level control device designed to provide a further state change signal for changing the operating state of the first component, wherein the higher-level control device determines a command for optimized production flow; and
   a monitoring device for monitoring the controlling of the plurality of components of the production plants by the energy control device and the higher-level control device, wherein the monitoring device is designed to receive the first state change signal of the energy control device and the further state change signal of the higher-level control device and to:
      provide the first state change signal of the energy control device for changing the first operating state into the second operating state,
      modify the first state change signal of the energy control device for providing the second operating state, and
      block the first state change signal of the energy control device for preventing a state change into the second operating state,
   wherein the monitoring device performs one of providing, modifying, and blocking based on a comparison of the first state change signal of the energy control device with the further state change signal.

2. The device as claimed in claim 1, wherein the monitoring device is designed to provide a third operating state alternative to the second operating state if the monitoring device blocks the first state change signal of the energy control device.

3. The device as claimed in claim 1, wherein the monitoring device is designed to provide the energy control device with a current operating state of the first component for synchronizing the energy control device with the at least one component.

4. The device as claimed in claim 1, wherein the monitoring device is designed to block the first state change signal of the energy control device if the changing of the first operating state into the second operating state is predetermined as an unallowed and/or as an impossible state change.

5. The device as claimed in claim 1, wherein the monitoring device is designed to provide the first state change signal of the energy control device and to block the further state change signal of the higher-level control device if the first state change signal of the energy control device has a predetermined, higher priority than the further state change signal of the higher-level control device, and to provide the further state change signal of the higher-level control device and to block the first state change signal of the energy control device if the further state change signal of the higher-level control device has the predetermined higher priority.

6. The device as claimed in claim 1, wherein the monitoring device is designed to deactivate the energy control device for blocking the first state change signal and/or to activate the energy control device for providing the state change signal.

7. The device as claimed in claim 6, wherein the energy control device, after activating, is designed to read out the current operating state of the first component.

8. The device as claimed in claim 1, wherein the monitoring device is designed to monitor a state change time of the state change from the first operating state into the second operating state and, if the state change time exceeds a predetermined threshold value, to specify the associated state change signal as an impossible and/or unauthorized state change signal.

9. The device as claimed in claim 1, wherein the monitoring device is designed to provide at least one intermediate operating state for modifying the first state change signal of the energy control device, if the second operating state can only be reached via the at least one intermediate operating state from the first operating state.

10. The device as claimed in claim 1, wherein the monitoring device is designed to modify the first state change signal for performing a test cycle.

11. A production system having a production plant having a plurality of components and having a device for controlling an operating state of the at least one component of a production plant, comprising:

an energy control device for controlling operating states of the plurality of components of the production plant, wherein the energy control device determines an energy efficient operating state for each respective component of the plurality of components when use of the respective component of the plurality of components is not expected, and wherein the energy control device provides a first state change signal for changing the operating state of a first component from a first operating state into a second operating state, wherein at least one of the first operating state and the second operating state are at least one of: an off state, an on state, and a stand-by state;

a higher-level control device designed to provide a further state change signal for changing the operating state of the first component, wherein the higher-level control device determines a command for optimized production flow; and a monitoring device for monitoring the controlling of the plurality of components of the production plants by the energy control device and the higher-level control device, wherein the monitoring device is designed to receive the first state change signal of the energy control device and the further state change signal of the higher-level control device and to:

provide the first state change signal of the energy control device for changing the first operating state into the second operating state, modify the first state change signal of the energy control device for providing the second operating state, and block the first state change signal of the energy control device for preventing a state change into the second operating state, wherein the monitoring device performs one of providing, modifying, and blocking based on a comparison of the first state change signal of the energy control device with the further state change signal.

12. A method for controlling an operating state of a plurality of components of a production plant, comprising:

providing, by an energy control device, a state change signal for changing the operating state of at least one component of the plurality of components from a first operating state into a second operating state, wherein the energy control device determines an energy efficient operating state for each respective component of the plurality of components when use of the respective component of the plurality of components is not expected, providing, by a higher-level control device designed to provide a further state change signal for changing the operating state of the first component, a command for optimized production flow, and receiving, by a monitoring device, the state change signal of the energy control device and the further state change of the higher-level control device, wherein the monitoring device either provides the state change signal of the energy control device for changing the first operating state into the second operating state, modifies the state change signal of the energy control device for providing the second operating state, or blocks the state change signal of the energy control device for preventing the second operating state, based on a comparison of the first state change signal of the energy control device with the further state change signal, wherein the providing and receiving steps are also conducted for a second state change signal for changing the operation state of a second component of the plurality of components.

13. The device as claimed in claim 1, wherein the energy control device also provides a second state change signal for changing the operating state of a second component of the plurality of components from a first operating state into a second operating state, and the monitoring device is designed to:

receive the second state change signal of the energy control device and to provide the second state change signal of the energy control device for changing the first operating state into the second operating state, modify the second state change signal of the energy control device for providing the second operating state, and block the second state change signal of the energy control device for preventing a state change into the second operating state.

14. The device as claimed in claim 1, wherein the monitoring device is designed to deactivate the energy control device for blocking the first state change signal, further wherein the energy control device is operated in at least one of a state of rest and a synchronizable state.

* * * * *